A far-IR imaging array comprising a two-dimensional array of chalcogenide glass thermistor bolometers. A two-dimensional system of metallic strips arranged in a grid structure has insulating film between the strips at the points of intersection of each horizontal and vertical strip. A bolometer is placed at each intersection so as to bridge the insulator thereat. If an infrared image is focused on the array, the resistance of each bolometer can be determined by a scanning system.

United States Patent

Bishop et al.

[11] 3,767,928
[45] Oct. 23, 1973

[54] TWO-DIMENSIONAL IMAGING ARRAY OF CHALCOGENIDE GLASS BOLOMETERS

[75] Inventors: Stephen G. Bishop, Arlington, Va.; William J. Moore, Hyattsville, Md.

[73] Assignee: The United States of America as represented by the Secretary of the Navy

[22] Filed: June 8, 1972

[21] Appl. No.: 260,864

[52] U.S. Cl.................................. 250/338, 250/349
[51] Int. Cl................................................ G01t 1/16
[58] Field of Search.................. 250/83.3 H, 83.3 R, 250/220 M, 338, 349, 332; 73/193 R, 355 R; 136/213

[56] References Cited
UNITED STATES PATENTS
3,564,257  2/1971  Berry et al..................... 250/83.3 H Primary Examiner—James W. Lawrence
Assistant Examiner—Davis L. Willis
Attorney—R. S. Sciascia et al.

[57] ABSTRACT

10 Claims, 1 Drawing Figure

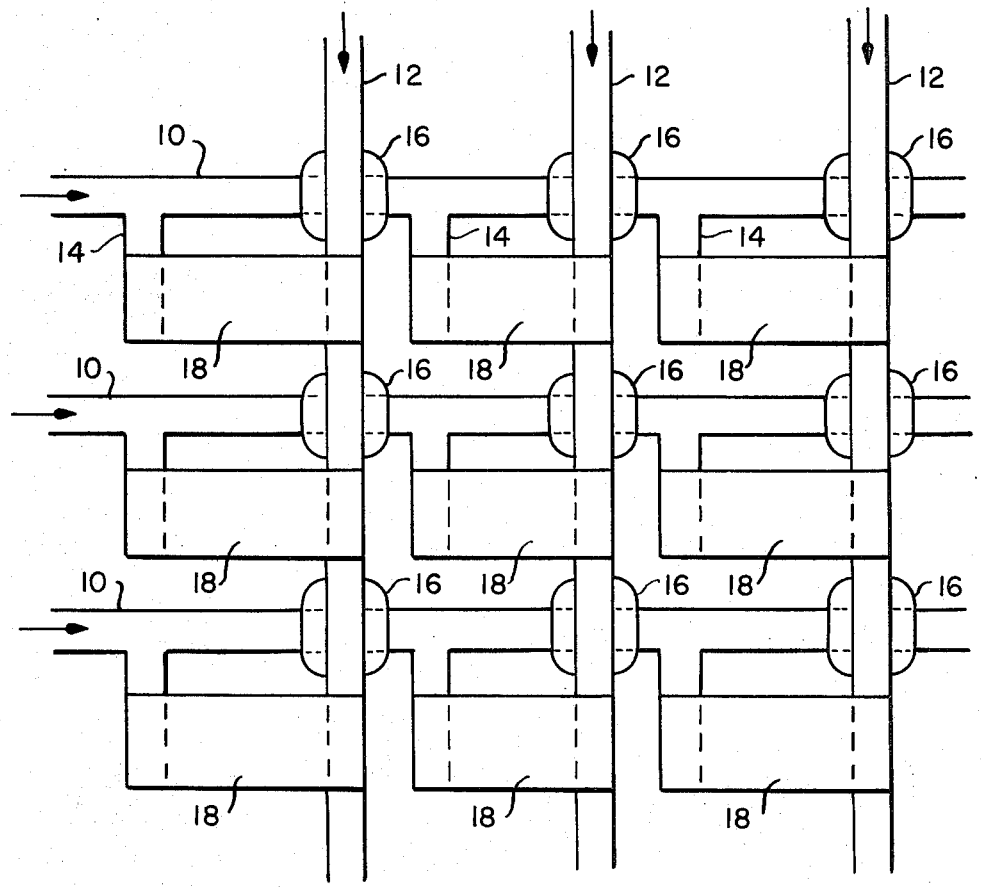

TWO-DIMENSIONAL IMAGING ARRAY OF CHALCOGENIDE GLASS BOLOMETERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to two-dimensional arrays of individually addressed radiation detectors and especially to such an array of far-IR (infrared radiation) detectors.

Many imaging devices exist which operate in the visible and near-infrared spectral ranges. These devices nearly all employ uniform and continuous photoemissive or photoconductive surfaces for the detection of the radiation. Such systems do not detect the infrared radiation emitted by bodies at or near room temperature. Imaging systems which do operate in this spectral range (wavelengths of 2 to 20 microns) usually employ a linear array of separately addressed infrared detectors across which the image to be detected is periodically swept by a mechanical scanning system. Each detector has a separate signal processing channel. The detectors used may be either cooled extrinsic or intrinsic photoconductors or room temperature thermal detectors such as crystalline thermistor bolometers or pyroelectric detectors. Each of these detectors must be fabricated and mounted separately and electrical wiring connections must be provided. The complexity and expense of this process limits the number of detectors provided in a linear array. The construction of a two-dimensional array or x-y matrix of such detectors is prohibitively expensive. A two-dimensional array eliminates the need for scanning the image, obviating the need for moving parts in the system. Such arrays exist, but contain so few detectors as to provide poor resolution and are expensive.

Another disadvantage to the linear array system is that the speed with which the image is swept across the detectors determines the required speed or response time for the detectors. In a two-dimensional array, only the movement of the subjects in the image need be accounted for in determining detector speed or response time. If a relatively stable scene is to be viewed, slow, sensitive detectors may be used thereby improving image quality.

BRIEF SUMMARY OF THE INVENTION

The objects and advantages of the present invention are obtained by using glass bolometers as resistive elements between horizontal and vertical, electrically conductive strips. The strips are arranged in a rectangular-coordinate grid and the bolometers are located at the intersectional points so as to connect between the horizontal and vertical strips. The strips are electrically insulated from each other.

OBJECTS

An object of this invention is to provide a two-dimensional imaging array of individually addressed IR detectors, especially one that operates in the far-IR region.

Another object is to provide such an array which is simple to construct, inexpensive and easily interfaced with present-day scanning devices.

Other objects, advantages and novel features of the invention will become apparent from the following detailed description of the invention when considered in conjunction with the accompanying drawings wherein:

BRIEF DESCRIPTION OF THE DRAWING

The single FIGURE is a schematic illustration of a two-dimensional array used in an embodiment of the invention.

DETAILED DESCRIPTION OF THE INVENTION

As can be seen from the FIGURE, the array comprises a plurality of horizontal and vertical metallic strips, 10 and 12 respectively, arranged perpendicularly with respect to each other in a coordinate or grid structure, which will hereinafter be called an x-y grid. The FIGURE shows a 3 × 3 grid although larger grids may be easily constructed.

The metal may, for example, be molybdenum and the array is constructed by depositing the horizontal strips by evaporation or r-f sputtering techniques on a substrate such as planar glass. Each horizontal strip 10 has a vertical-strip appendage 14 at regularly spaced horizontal intervals and in vertical columns. The patterns of the depositions are defined by standard photolithographic masking techniques.

Pads 16 of an electrically insulating material such as silicon dioxide ($SiO_2$) are then deposited over each horizontal strip 10 between the appendages 14. Next vertical strips 12 of molybdenum are deposited so that each passes over a column of the insulating pads 16. Thus, none of the vertical strips makes electrical contact with any of the horizontal strips.

Finally, rectangular or square detector elements 18 are deposited so that one edge overlaps and contacts a vertical-appendage strip 14 and the right edge overlaps and contacts a vertical conducting strip 12. These detector elements, or thermistor bolometers, 18 are formed from a semiconductor glass, such as the chalcogenide glass $Tl_2Se\ As\ Te_3$, which changes its electrical conductivity as a function of its temperature. Infrared radiation causes heating of this glass and consequent change in its conductivity or resistance. The glass operates at room temperature and at atmospheric pressure. It is sensitive to radiation from the visible, near IR and Far-IR regions.

There is a large range of alloy compositions in the group of elements consisting of thallium (Tl), selenium (Se), arsenic (As) and tellurium (Te) from which such thermistor bolometers can be constructed having various sensitivities. The Cd—Ge—As, Cd—Ge—P, As—Te—Se groups, and groups based on Ge—Te and containing varying amounts of As, Si and Ge also provide some alloy compositions which are suitable. In general, any group of amorphous or glassy alloys based on the chalcogens S, Se and Te may provide suitable compositions.

By selecting the proper pair of vertical and horizontal strips, it is possible to measure the resistance of a given bolometer, since one and only one bolometer bridges a given pair of vertical and horizontal strips. If an image or pattern of IR is focused on the array, the intensity pattern of the radiation (i.e., the image) can be determined or reproduced by measuring the resistance of each bolometer in the array. This is done by scanning techniques.

Apparatus for scanning the array is described in the literature; for example, see Chap. 19, "Phototelectronic Imaging Devices," Vol. 2, 1971, by Biberman and Nudelman, published by Plenum Press, N.Y.

An array of chalcogenide glass dots or bolometers may be employed as the retina in a vidicon-type electron tube. Such thermicons have been constructed using continuous layers of crystalline semiconductors. However, it is difficult to achieve low dark current in such devices. In addition, lateral heat conductivity in the semiconductor layer causes blurring of the image. With the chalcogenide glass, an array of tiny dots or islands of semiconducting material which would be well isolated from one another could be deposited on a thermally insulating substrate by the r.f. sputtering technique. In addition, a relatively low conductivity glass could be chosen to limit the dark current. The operation of this system is similar to that of a standard vidicon in which a photoconductive layer with transparent electrode on the front surface is scanned by an electron beam on the back surface. In the case of a thermicon, thermally activated changes of conductivity rather than photocurrent are sensed by the scanned electron beam.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A light-imaging array comprising, in combination:
   a plurality of conductors arranged in orthogonal, spaced horizontal rows and vertical columns to form a rectangular-coordinate grid, each row being extended to form vertical appendages each of which is spaced from its nearest columnar neighbor;
   a plurality of electrically insulative pads, each pad being loacated at a different intersection of the rows and columns of said grid and each pad lying between the row and column conductor at its associated intersection so that the rows and columns do not make electrical contact with each other; and
   a plurality of thermistor bolometers fabricated from semiconductor material whose resistance changes as a function of its temperature, each bolometer being located at a different intersection of said grid, and each bolometer lying across and being in electrical contact with the vertical appendage and the columnar conductor associated with its intersection.

2. An array as in claim 1, said semiconductor material being operative at room temperature and at atmospheric pressure.

3. An array as in claim 1, said semiconductor material being sensitive to light in the far-IR region.

4. An array as in claim 1, said semiconductor material being of the chalcogenide glass type.

5. An array as in claim 1, said semiconductor material being of glass formed from an alloy based on the chalcogens S, Se and Te.

6. An array as in claim 1, said semiconductor material being of glass formed from an alloy based on the group As, Te and Se.

7. An array as in claim 1, said semiconductor material being a glass having the composition $Tl_2Se\ As\ Te_3$.

8. An array as in claim 1, said semiconductor material being a glass based on the Ge—Te elements and containing an amount of As or Si.

9. An array as in claim 1, said semiconductor material being a glass based on the Ge—Te elements and containing various quantitative combinations of As and Si.

10. An array as in claim 4, wherein said conductors are in the form of metallic strips.

* * * * *